(12) United States Patent
Perreault et al.

(10) Patent No.: US 9,401,664 B2
(45) Date of Patent: Jul. 26, 2016

(54) CIRCUITS AND TECHNIQUES FOR INTERFACING WITH AN ELECTRICAL GRID

(71) Applicant: Massachusetts Institute of Technology, Cambridge, MA (US)

(72) Inventors: David J. Perreault, Andover, MA (US); Brandon J. Pierquet, San Francisco, CA (US)

( * ) Notice: Subject to any disclaimer, the term of this patent is extended or adjusted under 35 U.S.C. 154(b) by 490 days.

(21) Appl. No.: 13/795,633

(22) Filed: Mar. 12, 2013

(65) Prior Publication Data
US 2013/0314948 A1 Nov. 28, 2013

Related U.S. Application Data

(60) Provisional application No. 61/651,820, filed on May 25, 2012.

(51) Int. Cl.
*H02M 7/497* (2007.01)
*H02M 7/48* (2007.01)
*H02M 7/797* (2006.01)

(52) U.S. Cl.
CPC ............ *H02M 7/497* (2013.01); *H02M 7/4807* (2013.01); *H02M 7/797* (2013.01)

(58) Field of Classification Search
CPC ....... H02M 7/4807; H02M 7/42; H02M 7/44; H02M 7/00; H02M 7/04; H02M 7/497; H02M 7/49

USPC .............. 363/123, 132, 37, 65, 71, 131, 157, 363/159, 8, 9, 95; 307/82

See application file for complete search history.

(56) References Cited

U.S. PATENT DOCUMENTS

| | | | |
|---|---|---|---|
| 3,370,215 | A | 2/1968 | Light, Jr, |
| 5,159,539 | A | 10/1992 | Koyama |
| 5,198,970 | A | 3/1993 | Kawabata et al. |
| 5,268,832 | A | 12/1993 | Kandatsu |
| 5,331,303 | A | 7/1994 | Shiota |
| 5,982,645 | A | 11/1999 | Levran et al. |
| 6,339,538 | B1 | 1/2002 | Handleman |
| 6,507,503 | B2 | 1/2003 | Norrga |
| 6,700,803 | B2 | 3/2004 | Krein |
| 6,934,167 | B2 | 8/2005 | Jang et al. |
| 7,072,195 | B2 | 7/2006 | Xu |
| 7,269,036 | B2 | 9/2007 | Deng et al. |
| 7,521,914 | B2 | 4/2009 | Dickerson et al. |
| 7,768,800 | B2 | 8/2010 | Mazumder et al. |

(Continued)

OTHER PUBLICATIONS

Response to Office Action dated Mar. 22, 2013 filed on Jun. 5, 2013.

(Continued)

*Primary Examiner* — Fred E Finch, III
*Assistant Examiner* — Gustavo Rosario Benitez
(74) *Attorney, Agent, or Firm* — Daly, Crowley, Mofford & Durkee, LLP

(57) ABSTRACT

Circuit topologies and control methods for a multi-phase grid interface are described. In at least one embodiment, a power conversion circuit is provided that includes an inverter stage, a transformer stage, and a cycloconverter stage. The cycloconverter stage may include one cycloconverter circuit for each of multiple phases associated with a multi-phase grid. In some embodiments, each cycloconverter circuit may include first and second half-bridge circuits coupled back-to-back.

24 Claims, 8 Drawing Sheets

(56) References Cited

U.S. PATENT DOCUMENTS

| | | | |
|---|---|---|---|
| 7,940,038 B2 | 5/2011 | Da Silva et al. | |
| 8,130,518 B2 | 3/2012 | Fishman | |
| 2004/0170030 A1 | 9/2004 | Duerbaum et al. | |
| 2008/0198634 A1* | 8/2008 | Scheel | H02M 3/158 363/21.02 |
| 2009/0196082 A1 | 8/2009 | Mazumder et al. | |
| 2009/0251938 A1* | 10/2009 | Hallak | H02M 7/4807 363/132 |
| 2009/0302686 A1 | 12/2009 | Fishman | |
| 2009/0323380 A1 | 12/2009 | Harrison | |
| 2010/0142239 A1 | 6/2010 | Hopper | |
| 2010/0284208 A1* | 11/2010 | Nguyen | H02M 7/4807 363/160 |
| 2011/0062786 A1* | 3/2011 | Rozman et al. | 307/82 |
| 2011/0181128 A1 | 7/2011 | Perreault et al. | |
| 2012/0092898 A1* | 4/2012 | Raju | H02M 3/33561 363/17 |
| 2012/0306454 A1* | 12/2012 | Ransom et al. | 320/145 |

OTHER PUBLICATIONS

PCT Preliminary Report on Patentability of the ISA for PCT/US2013/030383 dated Dec. 4, 2014.
Alspach; "Solar Power Inverter Manufacturers Get Day in Sun;" Boston Business Journal; Oct. 29, 2010; 1 page.
Denning; "Solar Market Is Risking Sunstroke;" Wall Street Journal; Dec. 11-12, 2010, 1 page.
Pierquet, et al.; "A Single-Phase Photovoltaic Inverter Topology with a Series-Connected Power Buffer;" (ECCE), IEEE, Sep. 2010, pp. 1-8.
Trubitsyn, et al.; High-Efficiency Inverter for Photovoltaic Applications; (ECCE), IEEE, Sep. 2010, pp. 1-9.
Bush, et al.; "A Single-Phase Current Source Solar Inverter with Reduced-Size DC Link;" Energy Conversion Congress and Exposition; IEEE; Sep. 20, 2009; pp. 54-59.
Krein, et al.; "Cost-Effective Hundred-Year Life for Single-Phase Inverters and Rectifiers in Solar and LED Lighting Applications Based on Minimum Capacitance Requirements and a Ripple Power Port;" Applied Power Electronics Conference and Exposition; IEEE, Feb. 15, 2009; pp. 620-625.
Li; "A Review of the Single Phase Photovoltaic Module Integrated Converter Topologies With Three Different DC Link Configurations;" IEEE Transactions on Power Electronics; vol. 23; No. 3; May 2008; pp. 1320-1333.
Ozpineci, et al.; "Cycloconverters;" An on-line tutorial for the IEEE Power Electronics Society; http://pels.org/Comm/Education/Tutorials/tutorials.htm; 2001.
Invitation to Pay Additional Fees in PCT/US2011/022056 dated Jul. 5, 2011.
Partial Search Report of the ISA for PCT/US2011/022056 dated Jul. 5, 2011.
PCT Search Report of the ISA for PCT/US2011/022056 dated Sep. 23, 2011.
Written Opinion of the ISA for PCT/US2011/022056 dated Sep. 23, 2011.
International Preliminary Report on Patentability for PCT/US2011/022056 dated Aug. 2, 2012.
Perreault, et al.; U.S. Appl. No. 13/011,317, filed Jan. 21, 2011.
U.S. Appl. No. 13/011,317, filed Jan. 21, 2011; 224 pages.
Kjaer, et al.; "A Review of Single-Phase Grid-Connected Inverters for Photovoltaic Modules;" IEEE Transactions on Industry Applicatons; vol. 41; No. 5; Sep./Oct. 2005; pp. 1292-1306.
International Search Report of the ISA for PCT/US2013/030383 dated May 13, 2013.
Written Opinion of the ISA for PCT/US2013/030383 dated May 13, 2013.
Notice of Allowance dated Oct. 17, 2013 for U.S. Appl. No. 13/011,317; 13 pages.

\* cited by examiner

CIRCUITS AND TECHNIQUES FOR INTERFACING WITH AN ELECTRICAL GRID

CROSS REFERENCE TO RELATED APPLICATIONS

This application claims the benefit of U.S. Provisional Application No. 61/651,820 filed on May 25, 2012, which is hereby incorporated by reference in its entirety.

GOVERNMENT RIGHTS

This invention was made with government support under Grant No. EEC0540879 awarded by the National Science Foundation. The government has certain rights in this invention.

FIELD

The concepts described herein relate to power conversion techniques and circuits and, more particularly, to power conversion techniques and circuits that are suited for use with photovoltaic systems and multiphase systems, into which the grid can be included.

BACKGROUND

As is known in the art, a photovoltaic (PV) system is a system that uses one or more solar cells (also sometimes simply referred to as "cells") to convert light into electricity. Due to the relatively low voltage of an individual solar cell (typically on the order of 0.5 volts (V)), several solar cells are often combined into PV panels (also sometimes referred to as PV modules) which are in turn connected together into an array.

The electricity generated can be either stored, used directly (so-called Island/stand-alone plant), fed into a large electricity grid powered by central generation plants (so-called grid-connected/grid-tied plant), or combined with one or many domestic electricity generators to feed into a small grid (a so-called "hybrid plant").

As is also known, a PV system which is connected to an independent grid (e.g., the public electricity grid) and which is capable of feeding power into the grid is often referred to as a grid-connected system. This is a form of decentralized electricity generation. in the case of a building mounted grid connected PV system (e.g., a residential or office building), the electricity demand of the building is met by the PV system and any excess electricity is fed into the grid. The feeding of electricity into the grid requires the transformation of direct current (DC) into alternating current (AC). This function is performed by an inverter.

On the AC side, a grid-connected inverter supplies electricity in sinusoidal form, synchronized to the grid frequency, with an output voltage corresponding to that of the grid voltage.

On the DC side, the power output of a module varies as a function of the voltage in a way that power generation can be optimized by varying the system voltage to find a so-called maximum power point. Most inverters therefore incorporate maximum power point tracking.

The AC output is typically coupled across an electricity meter into the public grid. The electricity meter preferably runs in both directions since at some points in time, the system may draw electricity from the grid and at other points in time, the system may supply electricity to the grid.

As is also known, grid tied inverters for photovoltaic (PV) systems have also evolved since their inception. Grid tied inverters for PV systems traditionally managed large series-parallel connected arrays and then evolved to also handle lower power strings of panels, and have further evolved to operate with a single PV module. As such, varying inverter designs now cover a power range of four orders of magnitude.

Connecting electronic devices to an AC distribution system is a well understood task, and significant work has been completed in both sourcing power from, and delivering power to the grid. Much of this work is focused on three-phase interconnection of varying line voltages, with power levels ranging from 10-500 kW, often for applications in motor drives, electric vehicle drive-trains, wind turbines, and uninterruptible power supply (UPS) systems. At these power levels, with a three phase distribution system, efficiencies up to 98% are achievable. This is in contrast to electrical systems found in commercial and residential environments, which often operate on single or split-phase systems at a significantly lower power level.

SUMMARY

In accordance with one aspect of the concepts, systems, circuits, and techniques described herein, a power conversion circuit is provided having an input port to receive a direct current (DC) input signal and multiple output ports which comprise a multi-phase alternating current (AC) output signal. More specifically, the power conversion circuit comprises: an inverter circuit to convert the DC input signal to an AC output current at an inverter output port, the inverter circuit including a number of controllable switches; a transformer stage having a primary port and multiple secondary ports, the primary port coupled to receive the AC output current of the inverter circuit, wherein the transformer stage is configured to provide at least one of electrical isolation and voltage transformation between the DC input and AC output ports; and a cycloconverter stage having multiple cycloconverter circuits, each of the multiple cycloconverter circuits to support a corresponding phase of the multi-phase AC output signal of the power conversion circuit and including a number of controllable switches, wherein each of the multiple cycloconverter circuits includes an input port coupled to receive an input signal from a corresponding port of the transformer stage and an output port to provide an output signal of the power conversion circuit for the corresponding phase, wherein each of the multiple cycloconverter circuits are controlled to provide a phase-shift between a resonant AC current and a voltage switching function based, at least in part, on a sign of an applied voltage at a corresponding cycloconverter output port.

In one embodiment, the relative phases of switching timing patterns of the inverter circuit and the multiple cycloconverter circuits are selected such that a desired power transfer is achieved between the input port of the power conversion circuit and the cycloconverter output ports.

In one embodiment, one or more of the input ports of the multiple cycloconverter circuits are galvanically isolated from the inverter circuit.

In one embodiment, each of the input ports of the multiple cycloconverter circuits are galvanically isolated from the input ports of the other cycloconverter circuits.

In one embodiment, the multiple cycloconverter circuits are each comprised of first and second half-bridge circuits.

In one embodiment, the first and second half-bridge circuits include first and second unidirectional voltage blocking half-bridge circuits coupled in a back-to-back configuration.

In one embodiment, each of the multiple cycloconverter circuits includes a first half-bridge circuit having first, second, and third terminals and a second half-bridge circuit having first, second, and third terminals, wherein the first terminal of each of the first and second half-bridge circuits corresponds to the input of the cycloconverter circuit, the second terminal of each of the first and second half-bridge circuits corresponds to the output of the cycloconverter circuit, and the third terminals of the first and second half-bridge circuits are coupled to one another.

In one embodiment, the first and second half-bridge circuits each include a bypass capacitor coupled between the second and third terminals thereof.

In one embodiment, the power conversion circuit further comprises a controller to control switching of switches within the inverter circuit and the multiple cycloconverter circuits, the controller being configured to: for a first polarity of a voltage signal provided at the output of a first cycloconverter circuit, bias first and second switches of the first half-bridge circuit of the first cycloconverter circuit into their conduction states and modulate the first and second switches of the second half-bridge of the first cycloconverter circuit.

In one embodiment, the controller is configured to: for a second, different polarity of the voltage signal provided at the output of the first cycloconverter circuit, bias the first and second switches of the second half-bridge circuit of the first cycloconverter circuit into their conduction states and modulate the first and second switches of the first half-bridge circuit of the first cycloconverter circuit.

In one embodiment, the power conversion circuit further comprises a resonant circuit operatively coupled between the inverter circuit and the cycloconverter stage to resonate an AC output current of the inverter before it reaches the cycloconverter stage.

In accordance with another aspect of the concepts, systems, circuits, and techniques described herein, a power conversion circuit is provided having input terminals to receive a direct current (DC) voltage signal and output terminals to output a multi-phase alternating current (AC) voltage signal. More specifically, the power conversion circuit comprises: an inverter circuit having input terminals and output terminals, the input terminals corresponding to the input terminals of the power conversion circuit, wherein the inverter circuit is configured to convert a DC voltage signal received at the input terminals to a high-frequency AC signal at the output terminals; a transformer stage having an input port coupled to the output port of the inverter circuit and having at least two output ports, wherein the transformer stage is configured to provide voltage transformation for the high-frequency AC signal at the output of the inverter circuit; and a cycloconverter stage having multiple cycloconverter circuits, each of the multiple cycloconverter circuits having an input port to receive a signal from a corresponding output port of the transformer stage and an output port to deliver an output signal having a corresponding phase of the multi-phase AC voltage signal, the multiple cycloconverter circuits each being configured to receive a high-frequency AC signal from the transformer stage and to frequency convert the high-frequency AC signal to generate the corresponding output signal, each cycloconverter circuit comprising: a first half-bridge circuit having first, second, and third terminals: and a second half-bridge circuit having first, second, and third terminals; wherein the first terminal of each of the first and second half-bridge circuits corresponds to one of the input terminals of the cycloconverter circuit, the second terminal of each of the first and second half-bridge circuits corresponds to one of the output terminals of the cycloconverter circuit, and the third terminal of each of the first and second half-bridge circuits is coupled to the third terminal of the other of the first and second half-bridge circuits.

In one embodiment, the first half-bridge circuit of each cycloconverter circuit comprises first and second switches each having first, second, and third terminals and a bypass capacitor and the second half-bridge circuit of the cycloconverter circuit comprises first and second switches each having first, second, and third terminals and a bypass capacitor.

In one embodiment, the power conversion circuit further comprises a controller to control switching of switches within the inverter circuit and the multiple cycloconverter circuits, the controller being configured to: for a first polarity of a voltage signal provided at the output of a first cycloconverter circuit, bias first and second switches of the first half-bridge circuit of the first cycloconverter circuit into their conduction states and modulate the first and second switches of the second half-bridge of the first cycloconverter circuit.

In one embodiment, the controller is configured to: for a second, different polarity of the voltage signal provided at the output of the first cycloconverter circuit, bias the first and second switches of the second half-bridge circuit of the first cycloconverter circuit into their conduction states and modulate the first and second switches of the first half-bridge circuit of the first cycloconverter circuit.

In one embodiment, the power conversion circuit further comprises a controller to control switching of switches within the inverter circuit and the multiple cycloconverter circuits, the controller being configured to: for at least some operating conditions, modulate the first switch of the first half-bridge circuit and the second switch of the second half-bridge circuit on and off substantially simultaneously, and modulate the second switch of the first half-bridge circuit and the first switch of the second half bridge circuit on and off substantially simultaneously.

In one embodiment, the power conversion circuit further comprises a controller to control switching of switches within the inverter circuit and the multiple cycloconverter circuits, the controller being configured to: for at least some operating conditions, modulate the first switch of the first half-bridge circuit and the first switch of the second half-bridge circuit on and off substantially simultaneously, and modulate the second switch of the first half-bridge circuit and the second switch of the second half-bridge circuit on and off substantially simultaneously.

In accordance with a further aspect of the concepts, systems, circuits, and techniques described herein, a system comprises: two or more cycloconverter circuits each having an input and an output, with each cycloconverter circuit comprising; a first half-bridge circuit having first, second, and third terminals, the first half-bridge circuit comprising first and second switches each having first, second and third terminals and a bypass capacitor; and a second half-bridge circuit having first, second, and third terminals, the second half-bridge circuit comprising first and second switches each having first, second, and third terminals and a bypass capacitor; wherein the first terminal of each of the first and second half-bridge circuits corresponds to the input of the cycloconverter circuit, the second terminal of each of the first and second half-bridge circuits corresponds to the output of the cycloconverter circuit, and the third terminal of the first half-bridge circuit is coupled to the third terminal of the second half-bridge circuit; and wherein each of the two or more cycloconverter circuits generates a corresponding phase of a multi-phase output signal.

In one embodiment, the system further comprises a controller to control switching of switches within the two or more cycloconverter circuits, the controller being configured to, for a first polarity of a voltage signal provided at the output of a first cycloconverter circuit, bias first and second switches of the first half-bridge circuit of the first cycloconverter circuit into their conduction states and modulate the first and second switches of the second half-bridge of the first cycloconverter circuit.

In one embodiment, the controller is configured to, for a second, different polarity of the voltage signal provided at the output of the first cycloconverter circuit, bias the first and second switches of the second half-bridge circuit of the first cycloconverter circuit into their conduction states and modulate the first and second switches of the first half-bridge circuit of the first cycloconverter circuit.

In one embodiment, the system further comprises a controller to control switching of switches within the inverter circuit and the multiple cycloconverter circuits, the controller being configured to, for at least some operating conditions, modulate the first switch of the first half-bridge circuit and the second switch of the second half-bridge circuit on and off substantially simultaneously, and modulate the second switch of the first half-bridge circuit and the first switch of the second half-bridge circuit on and off substantially simultaneously.

In one embodiment, the system further comprises a controller to control switching of switches within the inverter circuit and the multiple cycloconverter circuits, the controller being configured to: for at least some operating conditions, modulate the first switch of the first half-bridge circuit and the first switch of the second half-bridge circuit on and off substantially simultaneously, and modulate the second switch of the first half-bridge circuit and the second switch of the second half-bridge circuit on and off substantially simultaneously.

BRIEF DESCRIPTION OF THE DRAWINGS

The foregoing features of the concepts, systems, circuits, and techniques described herein may be more fully understood from the following description of the drawings in which.

DETAILED DESCRIPTION

Techniques and systems are provided for coupling a PV system, or other DC generating electrical system, to an independent, three-phase grid so that excess generated power can be delivered to the grid when available. Novel converter systems and techniques are described herein for providing such a connection. In some converter systems that utilize an inverter circuit, an energy buffer may be used to allow the inverter circuit to operate at or near constant power by controllably absorbing and releasing energy. For example, U.S. Patent Publication US 2011/0181128 (which is commonly owned with the present application and is incorporated by reference herein in its entirety) describes a converter system that uses a series-buffer-block topology that Includes an energy buffer to controllably absorb and release power to maintain a constant power flow between a DC input port and an AC output port. In various embodiments described herein, converters are provided that do not require the use of an energy storage buffer. This is because the three phase nature of the circuits provides constant power transfer without the additional circuitry. Even though the energy storage buffer can be eliminated, a series-buffer-block topology may still be used in different embodiments. The series-buffer-block topology described in the aforementioned patent application can be extended by the use of additional series connected blocks, with the limitation being the synthesis of the resonant current through the circuit.

Figure 1:
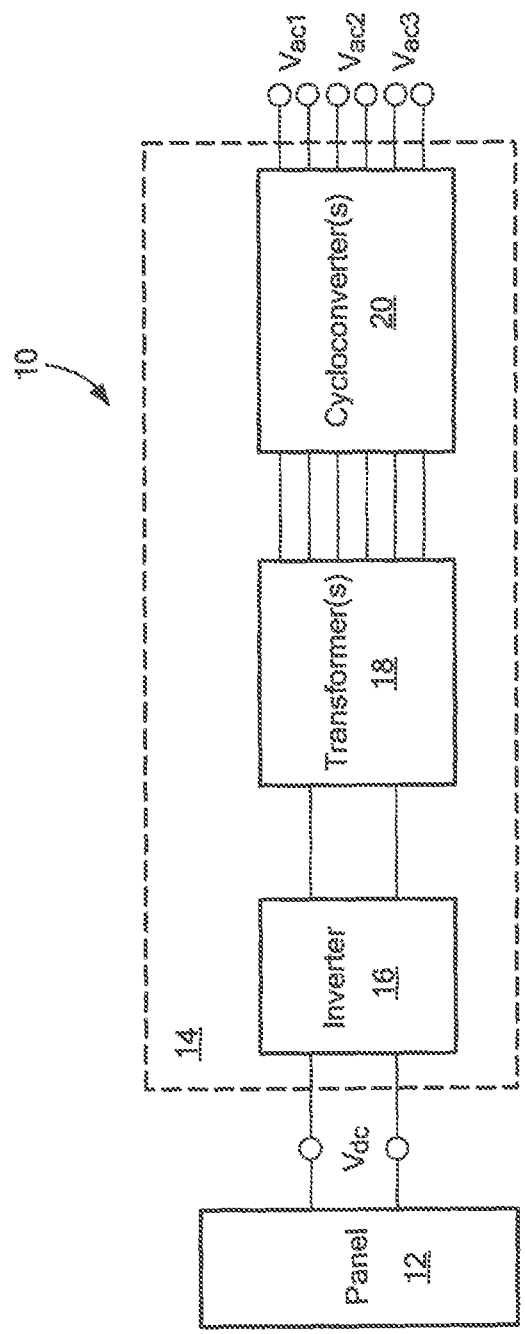
FIG. 1 is a block diagram illustrating an exemplary photovoltaic (PV) panel assembly in accordance with an embodiment.

FIG. 1 is a block diagram illustrating an exemplary photovoltaic (PV) panel assembly 10 in accordance with an embodiment. As illustrated, PV panel assembly 10 may include one or more PV panels 12 coupled to a power conversion circuit (or converter circuit) 14. PV panel 12 provides a DC output voltage $V_{dc}$ to an input port of converter circuit 14. Converter circuit 14 then converts the DC voltage $V_{dc}$ to a multi-phase AC output signal ($V_{ac1}$, $V_{ac2}$, $V_{ac3}$). The multi-phase AC output signal may then be provided to a multi-phase (e.g., three-phase) power grid or other multi-phase circuit. In some implementations, a power meter (which may be uni-directional or bi-directional) may be placed between converter circuit 14 and the power grid to keep track of power delivered to (and/or received from) the grid. Although illustrated with a PV panel 12 as a DC power source, it should be appreciated that other sources of DC input signals may alternatively be used, not excluding time-varying input signals.

As shown in FIG. 1, converter circuit 14 may include: an inverter circuit 16, a transformer stage 18, and a cyclocon-verter stage 20. Inverter circuit 16 is configured to convert the DC voltage signal $V_{dc}$ received at an input port thereof to an AC signal at an inverter output port. Transformer stage 18 is operative for stepping up or down the voltage of the AC signal provided by inverter 16 to provide one or more higher or lower voltage AC signals at an output thereof. Transformer stage 18 may also provide impedance shaping for converter 14. Transformer stage 18 also provides galvanic Isolation between the inverter circuit 16 and the remaining portions of the converter circuit 14.

Cycloconverter stage 20 is configured to receive one or more AC signals from the corresponding side of transformer stage 18 and to provide frequency conversion to the signal(s)

to generate a desired AC output frequency (e.g., a frequency required by a power grid or other multi-phase circuit, etc.). Cycloconverter stage 20 may be controlled to modulate a transfer of high frequency resonant current in response to a changing voltage on the AC port(s) of converter circuit 14. Cycloconverter stage 20 is capable of converting an AC waveform provided to it from transformer stage 18 to an AC waveform of a different frequency (either lower or higher) by synthesizing the output waveform from segments of the AC supply without an intermediate DC link. As described previously, in a three phase implementation, the converter circuit 14 does not require a buffer as the sum of all three phases will result in a constant (or near constant) power transfer.

Figure 2:
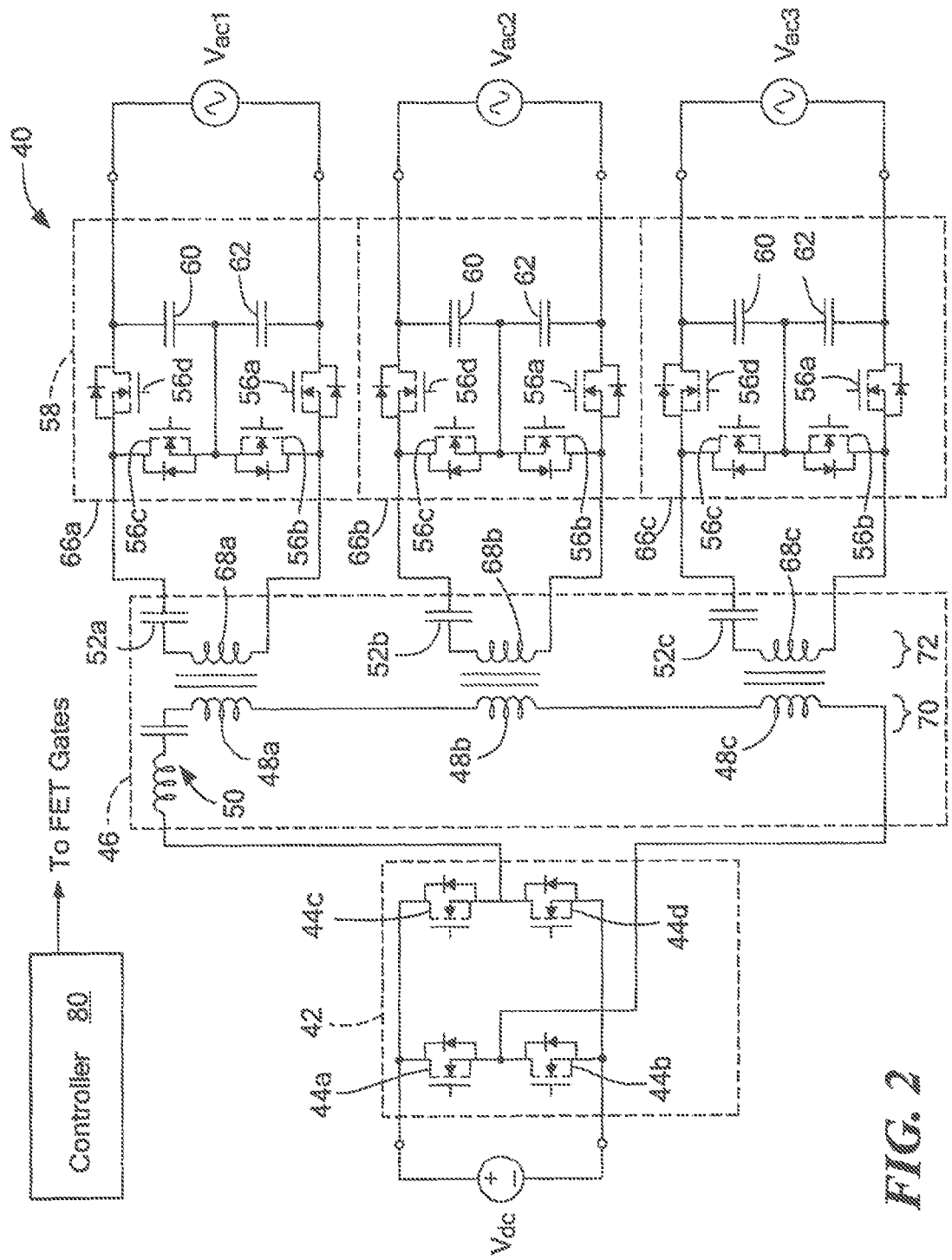
FIG. 2 is a schematic diagram illustrating an exemplary multi-phase converter circuit in accordance with an embodiment.

FIG. 2 is a schematic diagram illustrating an exemplary multi-phase converter circuit 40 in accordance with an embodiment. As shown, converter circuit 40 may include: an inverter 42, a transformer stage 46, and a cycloconverter stage 58. Inverter 42 may include four low-voltage devices 44a-44d arranged in a full-bridge configuration. Devices 44a-44d may include transistors acting as switches in some implementations. In addition, one or more diodes may be coupled across an output of each transistor in some implementations. Any type of transistors may be used for devices 44a-44d. In at least one embodiment, insulated gate field effect transistors (IGFETs) are used, but other types of FETs and other transistor types may alternatively be used in other implementations. One example of an IGFET is the metal oxide semiconductor FET, or MOSFET. Each of the devices 44a-44d may include an input terminal (e.g., a gate terminal for a FET, etc.) to which control signals may be applied.

Transformer stage 46 is coupled to an output of inverter 42. As illustrated, transformer stage 46 may include three individual transformers 48a, 48b, 48c, each having a primary side 70 and a secondary side 72, and a resonant tank circuit 50. Although tank circuit 50 is shown as part of transformer stage 46, it could also be shown as being part of, for example, inverter 42. Cycloconverter stage 58 includes three individual cycloconverter circuits 66a, 66b, 66c in the illustrated embodiment, one for each of three output phases. The three transformers 48a, 48b, 48c of transformer stage 46 each feed a corresponding one of the three cycloconverter circuits 66a, 66b, and 66c. In other implementations, a different number of output phases may be supported.

Each cycloconverter circuit 66a, 66b, 66c may include a plurality of switching devices 56a-56d. As before, these devices 56a-56d may includes transistors (e.g., IGFETs, etc.) in some embodiments. In some implementations, the transistors may be high voltage transistors. In addition, one or more diodes may be coupled across an output of each transistor. Each of the devices 56a-56d may include an input terminal (e.g., a gate terminal for a FET, etc.) to which control signals may be applied. The cycloconverter circuits 66a, 66b, 66c may also each include associated bypass capacitors 60, 62. Transformer stage 46 may be configured to provide voltage transformation between its primary side 70 and its secondary side 72, as well as appropriate impedance shaping. The input port of each cycloconverter circuit 66a, 66b, 66c may be coupled to receive a corresponding AC output signal of transformer stage 46. Each cycloconverter circuit 66a, 66b, 66c may provide an AC signal at an output port thereof having a desired output frequency and phase (e.g., an output frequency and phase associated with a three-phase power grid). The output phases of the cycloconverter circuits 66a, 66b, 66c may differ from one another; 2π/3 radians (120 degrees) in a three phase implementation. The output ports of the cycloconverter circuits 66a, 66b, 66c may serve as the output port of converter circuit 40.

In some implementations, each cycloconverter circuit 66a, 66b, 66c can be recognized as having two unidirectional voltage blocking half-bridge circuits placed back-to-back with a common source reference point. This permits the use of standard high-voltage IC gate drive circuitry for each half-bridge, with all devices and associated logic referenced to a single point. In normal operation, with a given (known) AC voltage polarity, a cycloconverter circuit can be controlled such that one half-bridge maintains its devices on while the other performs the switching modulation. Alternatively, or in addition, for some operational conditions (such as, for example, an AC voltage near zero, or uncertain AC voltage polarity), each cycloconverter 66a, 66b, 66c can be controlled such that devices 56a, 56d operate (i.e., are switched) substantially simultaneously, and devices 56b, 56c operate (i.e., are switched) substantially simultaneously, but complementary to devices 56a, 56d. It should be appreciated, however, that this is not the only operational method of the cycloconverter circuits 66a, 66b, 66c. That is, other alternative operational methods may be used. In addition, one may choose to vary the operational method that is used as conditions vary (e.g., depending on the amplitude of the AC voltage, the amount of current being processed, and/or other factors.)

Control may be realized with a controller 80 coupled to the input terminals (e.g., gate terminals) of devices 44a-44d of inverter 42 and devices 56a-56d of each of the cycloconverter circuits 66a, 66b, 66c. The controller 80 may provide combinations of phase-shift and pulse-width modulation and frequency control to inverter 42, phase shift of the cycloconverters 66a, 66b, 66c with respect to the full bridge, and pulse-width modulation of the cycloconverter half-bridges. Additional control of average power delivery can be obtained with on-off or burst mode control at a frequency below the switching frequency and above the line frequency and/or by bursting on and off for individual line cycles. It should be appreciated that in the embodiment of FIG. 2, devices 56a-56d may be provided as IGFETs, although other types of FETs or other types of switching elements may alternatively be used.

In some embodiments, controller 80 may be implemented using one or more digital processing devices. Any type of digital processing device may be used, including, for example, a general purpose microprocessor, a digital signal processor (DSP), a reduced instruction set computer (RISC), a field programmable gate array (FPGA), an application specific integrated circuit (ASIC), a microcontroller, an embedded controller, and/or others, including combinations of the above. Analog controllers or analog/digital controller circuits may alternatively be used.

In the embodiment of FIG. 2, series resonant tank circuit 50 is placed on the low-voltage side 70 of the transformers 48a, 48b, 48c. Placing the resonant tank 50 on the low-voltage side 70 of transformers 48a, 48b, 48c can reduce parasitic ringing with the parasitic capacitances across the transformer secondary windings 68a, 68b, 68c. Alternatively, the resonant tank 50 can be placed on the high-voltage side 72 of transformers 48a, 48b, 48c. Also, other resonant structures may be employed in place of, or in addition to, resonant tank 50 including, for example, parallel, series-parallel, LCL, LLC, LLC, immittance converters, and/or other structures. These resonant structures can optionally incorporate transformer parasitic elements such as, for example, transformer leakage inductance and parasitic capacitance, in some implementations.

In addition to the above, converter circuit 40 of FIG. 2 may include capacitors on one or both sides of the transformers 48a, 48b, 48c. For example, secondary side capacitors 52a, 52b, 52c may be provided as DC blocks for cycloconverter circuits 66a, 66b, 66c, respectively. The power flow in converter 40, specifically in the cycloconverters 66a, 66b, 66c, can be controlled using two related switch modulation methods in combination with the selection of the resonant current magnitude. Over a line cycle, this allows for four distinct operational strategies that can be combined to obtain hybrid schemes which may provide improved performance and/or efficiency for a given operating condition. Additionally, control over the switching frequency can be used to widen the input and output voltage operating ranges for a given set of load requirements.

In comparison to some existing designs, the topology shown in FIG. 2 effectively places all major power processing blocks (e.g., the high-frequency inverter and cycloconverters) in a series path with respect to the high-frequency resonant current. As described, this allows power-flow to be modulated in each stage by simply modifying the switching function relative to the current, with capacity for providing zero voltage switching of devices.

The placement of each stage in series with the drive current imposes a conduction loss penalty. However, using unipolar devices such as IGFETs and implementing zero voltage switching (ZVS) for the primary switches, allows the semiconductor area to be scaled up to reduce conduction loss. It should be noted that this is in contrast to devices, such as IGBTs, SCRs, and diodes, which operate with a fixed on-state voltage drop and therefore are not scalable.

Figure 3:
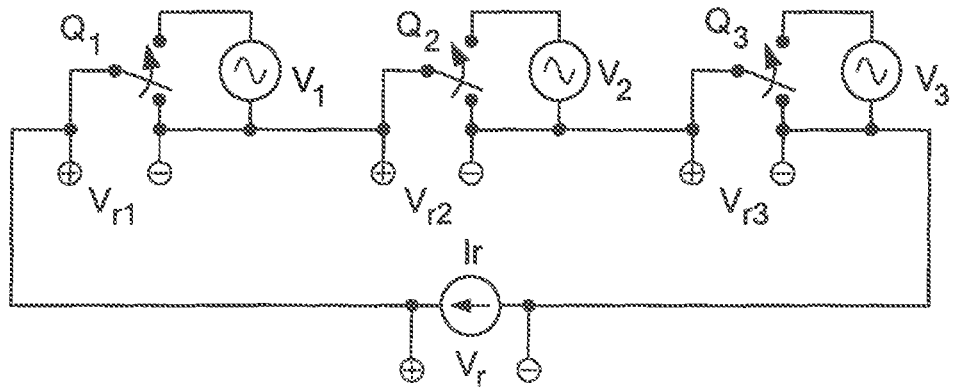
FIG. 3 is a block diagram of a three-phase output, series-connected converter using canonical switch models.

Referring now to FIG. 3, a simplified ideal switch model of a series connected three-phase converter output stage is illustrated. It should be noted that the circuit of FIG. 3 ignores the transformer isolation that would be used in a practical system ($V_{R1}$ would be high-frequency isolated, as would $V_{R2}$ and $V_{R3}$). The operation of a balanced three line voltage distribution system (i.e., balanced three-phase operation) relies on sinusoidal voltages with equal phase distribution over the $2\pi$ interval giving the terminal voltage constraints expressed in Equation (1):

$$V_i(t) = V_{pk} \sin(\omega_1 t + \phi_i) \quad (1)$$

for $i \in \{1, 2, 3\}$, where $\phi_1 = 0$, $\phi_2 = 2\pi/3$, and $\phi_3 = 4\pi/3$ for $V_1$, $V_2$, and $V_3$, respectively.

Figure 4:
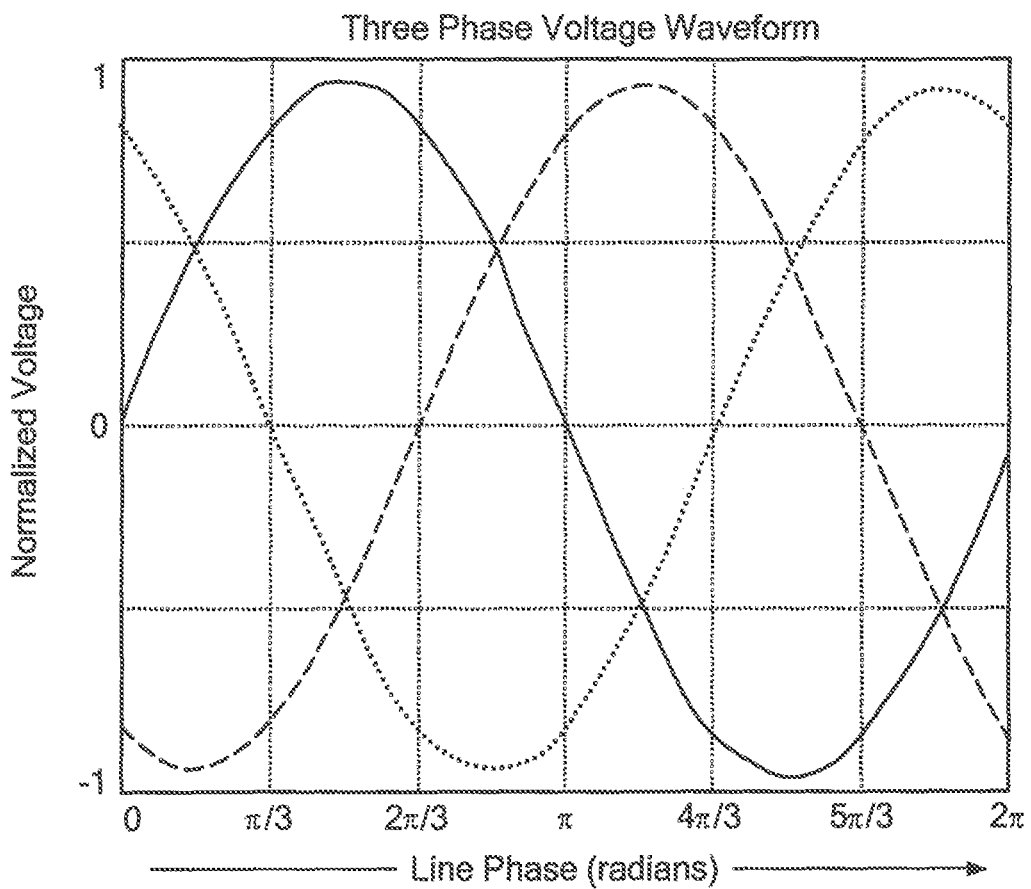
FIG. 4 is a diagram of three-phase voltage waveforms, where each sinusoid is separated by $2\pi/3$ radians.

Referring now to FIG. 4, a plot of normalized voltage over a $2\pi$ cycle for the three voltage sources shown in FIG. 3 is shown. For the generation of equal real power for each phase (unity power factor), the terminal current requirements are proportional to the voltages, with equal phase, as expressed below in Equation (2).

$$I_i(t) = I_{pk} \sin(\omega_1 t + \phi_i) \quad (2)$$

These voltage and current relationships yield the expected sinusoidal power transfer to each source as:

$$P_i(t) = V_i(t) I_i(t) = P_{pk} \sin^2(\omega_1 t + \phi_i) \quad (3)$$

Figure 5A:
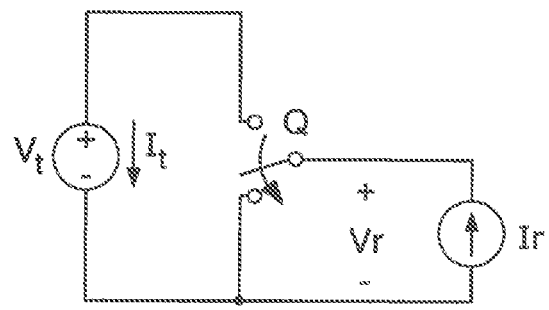
FIG. 5A is a schematic diagram of a standard switching module implemented with a canonical single-pole-dual-throw switch.
Figure 5B:
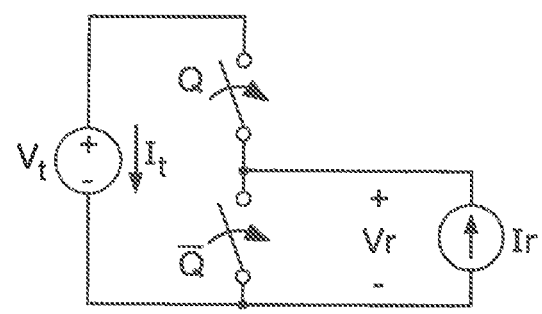
FIG. 5B is a schematic diagram of a standard switching module implemented with two complimentary single-pole-single-throw switches.
Figure 6:
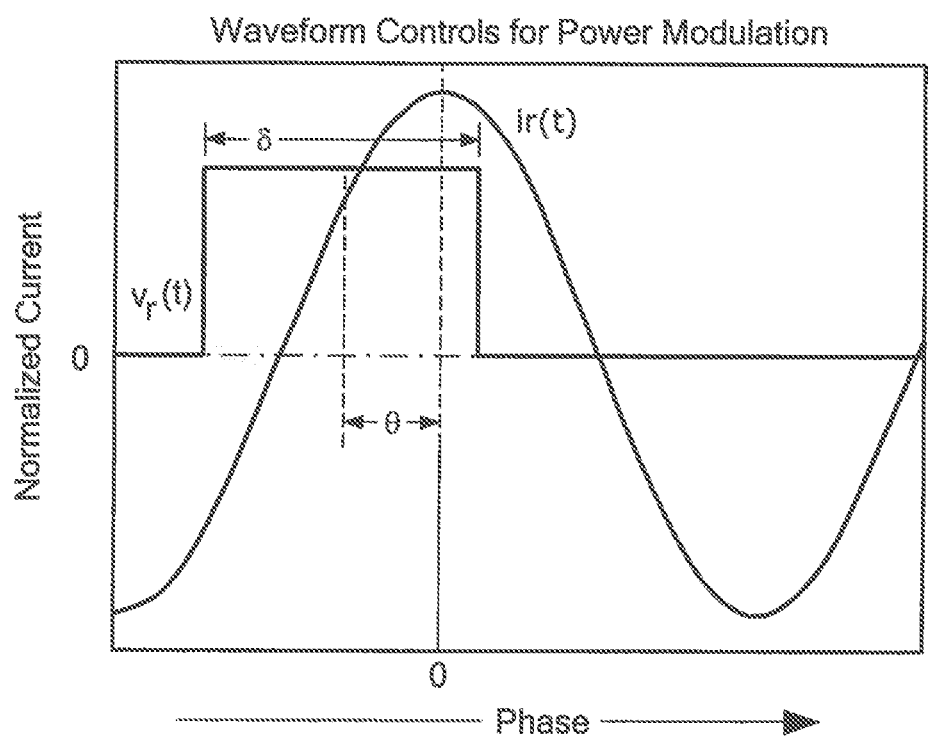
FIG. 6 is a plot of waveform controls for power modulation which shows that the relationship between the series path current and switching function determines the transfer of energy through the converter.

Referring now to FIGS. 5A and 5B, and with reference to power modulation, the modulation of power through the blocks of a converter is accomplished by controlling the switching function of each block relative to the series resonant current. The basic circuit models for a single block are presented in FIGS. 5A and 5B. FIG. 5A illustrates a switching module using a canonical single-pole dual-throw switch. FIG. 5B illustrates a functionally equivalent switching module using two complimentary single-pole-single-throw switches. The corresponding switching waveforms are shown in FIG. 6.

The power transfer for a circuit block is defined by voltage and current magnitudes, as well as two control variables: the pulse width $\delta$ and the phase shift $\theta$. Modulation by use of $\theta$ is called phase-shift modulation, while modulation by use of $\delta$ is called pulse-width modulation (PWM). For the analysis presented here, phase-shift control is used and $\delta$ is assumed to remain constant.

Equations (4)-(6) below describe the average transfer of power from the current source over a switching cycle:

$$P_r = \frac{1}{T} \int_0^T v_r(t) i_r(t) dt \quad (4)$$

$$P_r = \frac{V_t I_r}{\pi} \left( \sin\left(\frac{\delta}{2}\right) \cos(\theta) \right), \quad (5)$$

given the parameters $\delta$ and $\theta$, expressed in radians. This solution supposes that the terminal voltage $V_t$ and resonant current magnitude $I_r$ are constant. However, if these values are permitted to vary over time, but at a rate such that they can be considered constant over a switching cycle, the average power transfer over a switching cycle can be written as:

$$P(t) = \frac{v_r(t) I_r(t)}{\pi} \sin\left(\frac{\delta(t)}{2}\right) \cos(\theta(t)). \quad (6)$$

The expressions for power transfer for a single source in Equation (3), and the power transfer for the switching model in Equation (6), can be equated to obtain an expression for the control variable $\theta$, such that:

$$V_{pk} \sin(\omega_1 t + \theta_i) I_i(t) = \frac{V_{pk} \sin(\omega_1 t + \phi_i) I_r(t)}{\pi} \sin\left(\frac{\delta(t)}{2}\right) \cos(\theta_i(t)) \quad (7)$$

$$I_i(t) = \frac{I_r(t)}{\pi} \sin\left(\frac{\delta(t)}{2}\right) \cos(\theta_i(t)) \quad (8)$$

$$\pm \cos^{-1}\left( \frac{\pi I_i(t)}{I_r(t) \sin\left(\frac{\delta(t)}{2}\right)} \right) = \theta_i(t). \quad (9)$$

where the sign of the angle determines if the switching voltage leads or lags the current, ultimately resulting in either a hard-switching or soft-switching condition. The selection of the sign is also determined by the sign of the terminal voltage $V_i(t)$. For zero-voltage switching the desired condition is:

$$\mathrm{sgn}(\theta_i(t)) = \mathrm{sgn}(-V_i(t)). \quad (10)$$

Thus, the proper solution for $\theta_i(t)$ is:

$$\theta_i(t) = \mathrm{sgn}(-V_i(t)) \cos^{-1}\left( \frac{\pi I_i(t)}{I_r(t) \sin(\delta(t)/2)} \right) \quad (11)$$

Figure 7:
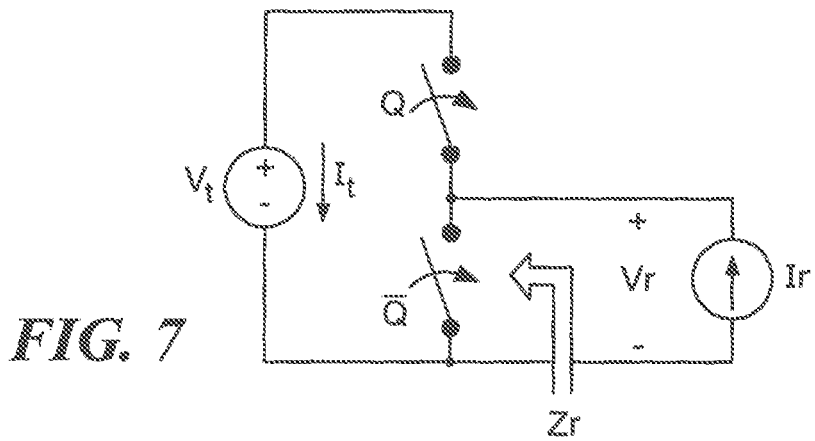
FIG. 7 is a schematic diagram which illustrates the input impedance notation of the canonical switching module shown in FIGS. 5A and 5B.

The waveforms of FIG. 6 can also be expressed and analyzed in terms of the phasors:

$$\bar{I}_r = I_r \quad (12)$$

$$\bar{V}_r = V_t \frac{2}{\pi} \sin\left(\frac{\delta}{2}\right) e^{j\theta} \quad (13)$$

with the implicit $e^{j\omega_s t}$ omitted. With the phasors defined, an equivalent impedance for each block can be generated, as indicated in FIG. 7. The impedance driven by the current source may be expressed as:

$$Z_r = \frac{V_r}{I_r} \quad (14)$$

$$Z_r = \frac{V_r}{I_r} \frac{2}{\pi} \sin\left(\frac{\delta}{2}\right) e^{j\theta} \quad (15)$$

which indicates that the impedance is a variable magnitude complex load, based on the selection of control variables δ and θ. Additionally, the variables in (15) can be extended using time varying phasors to give the time varying impedance:

$$Z_r(t) = \frac{V_r(t)}{I_r(t)} \frac{2}{\pi} \sin\left(\frac{\delta(t)}{2}\right) e^{j\theta(t)}. \quad (16)$$

When written in terms of an unknown line interface source $V_i(t)$, and the solution for $\theta_i(t)$, the result may be expressed as:

$$Z_i(t) = \frac{V_i(t)}{I_r(t)} \frac{2}{\pi} \sin\left(\frac{\delta_i(t)}{2}\right) [\cos(\theta_i(t)) + j\sin(\theta_i(t))] \quad (17)$$

$$Z_i(t) = \frac{V_i(t)}{I_r(t)} \frac{2}{\pi} \sin\left(\frac{\delta(t)}{2}\right) \left[ \frac{\pi I_i(t)}{\sin\left(\frac{\delta}{2}\right)I_r(t)} - j\mathrm{sgn}(V_i(t)) \sqrt{1 - \left(\frac{nI_i(t)}{\sin\left(\frac{\delta}{2}\right)I_r(t)}\right)^2} \right] \quad (18)$$

residing in an expression for the input impedance for a single block i. For the circuit in FIG. 3, the sum of the three sources is the total effective impedance seen by the resonant current source.

To find the sum of the three impedances over a line cycle, the expression must be broken up into multiple domains to account for the non-algebraic nature of the sign( ) function in each expression. The sub-domains are delineated by the voltage zero-crossing of the voltage sources. Additionally, the three-phase waveform sum is periodic over [0, π/3], so redundant sections can be avoided, leaving this single domain with even symmetry.

The equivalent impedance of the three series-connected blocks may be expressed as:

$$Z(t) = \frac{V_1(t)}{I_r(t)} \frac{2}{\pi} \sin\left(\frac{\delta(t)}{2}\right) \left[ \frac{\pi I_1(t)}{\sin\left(\frac{\delta}{2}\right)I_r(t)} - j\sqrt{1 - \left(\frac{\pi I_1(t)}{\sin\left(\frac{\delta}{2}\right)I_r(t)}\right)^2} \right] + \\
\frac{V_2(t)}{I_r(t)} \frac{2}{\pi} \sin\left(\frac{\delta(t)}{2}\right) \left[ \frac{\pi I_2(t)}{\sin\left(\frac{\delta}{2}\right)I_r(t)} + j\sqrt{1 - \left(\frac{\pi I_2(t)}{\sin\left(\frac{\delta}{2}\right)I_r(t)}\right)^2} \right] + \\
\frac{V_3(t)}{I_r(t)} \frac{2}{\pi} \sin\left(\frac{\delta(t)}{2}\right) \left[ \frac{\pi I_3(t)}{\sin\left(\frac{\delta}{2}\right)I_r(t)} - j\sqrt{1 - \left(\frac{\pi I_3(t)}{\sin\left(\frac{\delta}{2}\right)I_r(t)}\right)^2} \right] \quad (19)$$

which can be simplified by using only phase-shift modulation (δ=π), and assuming a constant magnitude for the resonant current envelope, $I_r(t) = \pi I_{pk}$. This simplification gives:

$$Z(t) = \frac{V_{pk}\sin(\omega_l t)}{\pi I_{pk}} \frac{2}{\pi} \left[ \sin(\omega_l t) - j\sqrt{1 - \sin^2(\omega_l t)} \right] + \quad (20)$$

$$\frac{V_{pk}\sin\left(\omega_l t - \frac{2\pi}{3}\right)}{\pi I_{pk}} \frac{2}{\pi} \left[ \sin\left(\omega_l t + \frac{2\pi}{3}\right) + j\sqrt{1 - \sin^2\left(\omega_l t + \frac{2\pi}{3}\right)} \right] + \\
\frac{V_{pk}\sin\left(\omega_l t + \frac{4\pi}{3}\right)}{\pi I_{pk}} \frac{2}{\pi} \left[ \sin\left(\omega_l t + \frac{4\pi}{3}\right) - j\sqrt{1 - \sin^2\left(\omega_l t + \frac{4\pi}{3}\right)} \right].$$

If this expression is then separated into real and imaginary parts, further simplification can occur. The real and imaginary components are orthogonal and can be treated independently. The real part may be expressed as:

$$\mathrm{Re}\{Z(t)\} = \frac{V_{pk}}{I_{pk}} \frac{2}{\pi^2} \left[ \sin^2(\omega_l t) + \sin^2\left(\omega_l t + \frac{2\pi}{3}\right) + \sin^2\left(\omega_l t + \frac{4\pi}{3}\right) \right] \quad (21)$$

$$\mathrm{Re}\{Z(t)\} = \frac{V_{pk}}{I_{pk}} \frac{3}{\pi^2}, \quad (22)$$

where the summation terms were reduced through traditional three-phase trigonometric identities. This result is notable due to the lack of time variance, although this is a byproduct of the constant power aspect of balanced three-phase systems.

Investigating the imaginary part of the impedance in (21), the substitutions $\cos x = \mp\sqrt{1-\sin^2 x}$ and $\sin(2x) = 2\sin(x)\cos(x)$ are used, with restriction to the domain (0, π/6) for simplicity, to obtain:

$$\mathrm{Im}\{Z(t)\} = \quad (23)$$

$$\frac{V_{pk}}{I_{pk}} \frac{2}{\pi^2} \left[ -\frac{1}{2}\sin(2\omega_l t) + \frac{1}{2}\left(2\omega_l t + \frac{2\pi}{3}\right) - \frac{1}{2}\sin\left(2\omega_l t + \frac{4\pi}{3}\right) \right],$$

Figure 8:
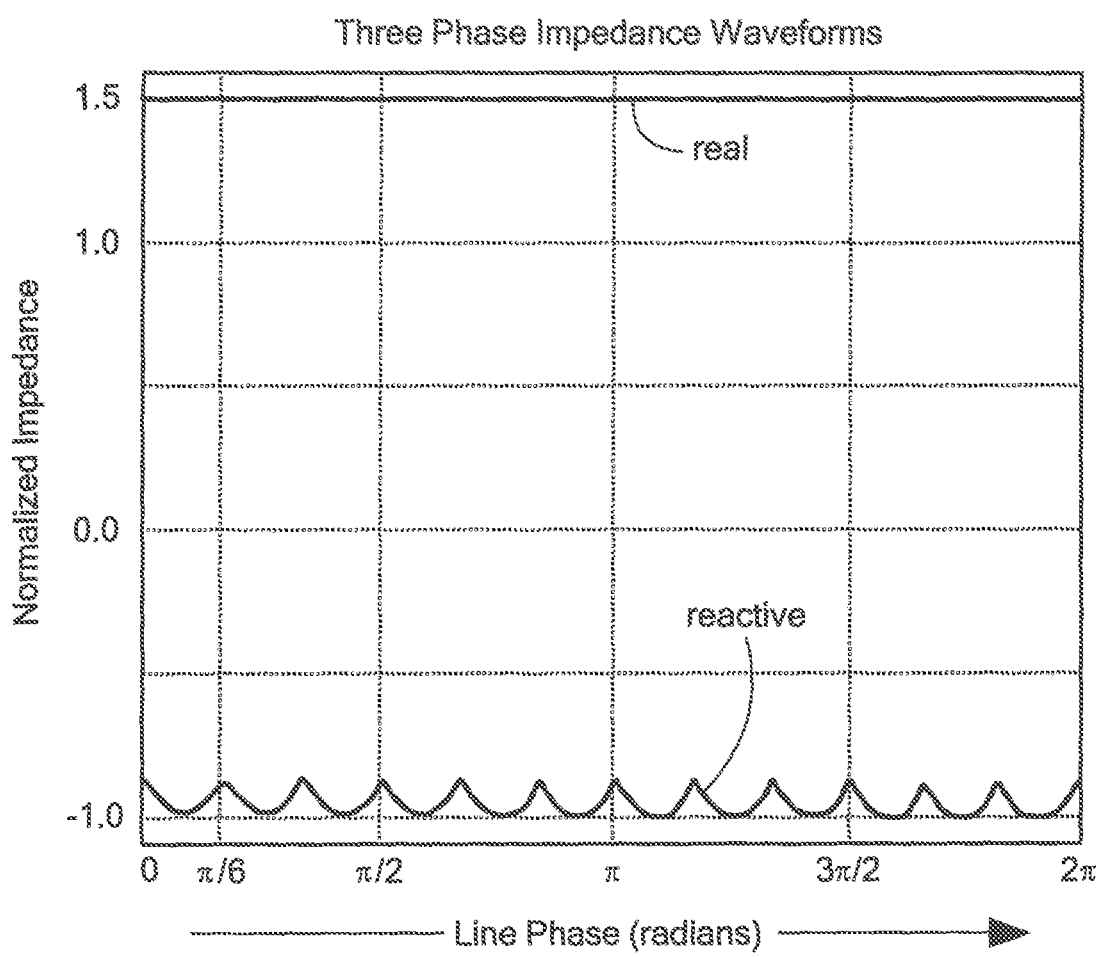
FIG. 8 is a plot of real and reactive impedance waveforms for a three-phase series-connected inverter.

This can be further reduced (with the same limited domain) to:

$$\mathrm{Im}\{Z(t)\} = -\frac{V_{pk}}{I_{pk}} \frac{2}{\pi^2} \sin\left(2\left[\omega_l t + \frac{\pi}{6}\right]\right), \quad (24)$$

which is periodic with even symmetry. The calculated real and reactive impedances of Equations (22) and (24) are plotted in FIG. 8. It is noted that these derivations can be repeated for non unity power factor operation.

Figure 9:
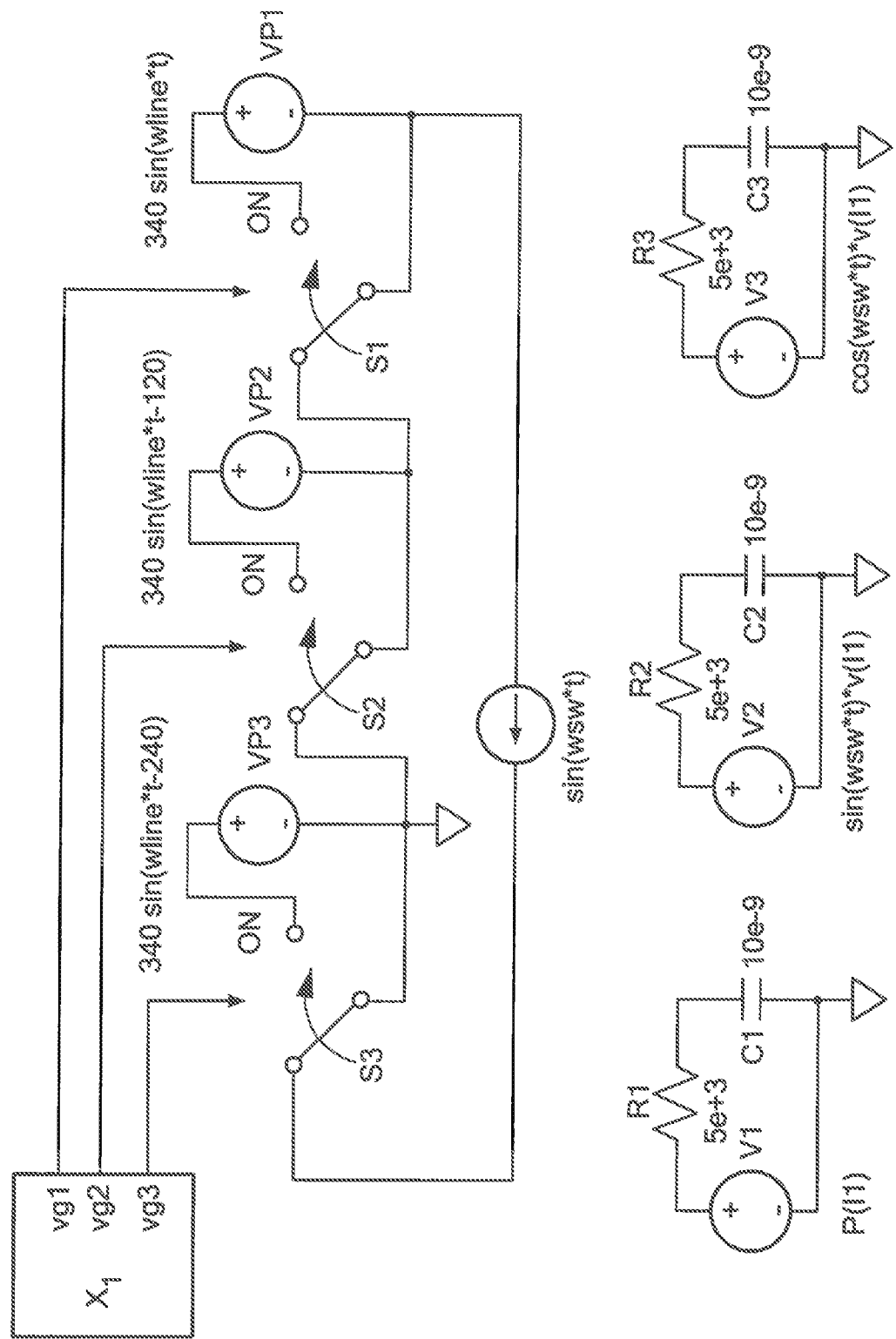
FIG. 9 is a schematic diagram of a circuit used to simulate a three-phase load impedance.
Figure 10:
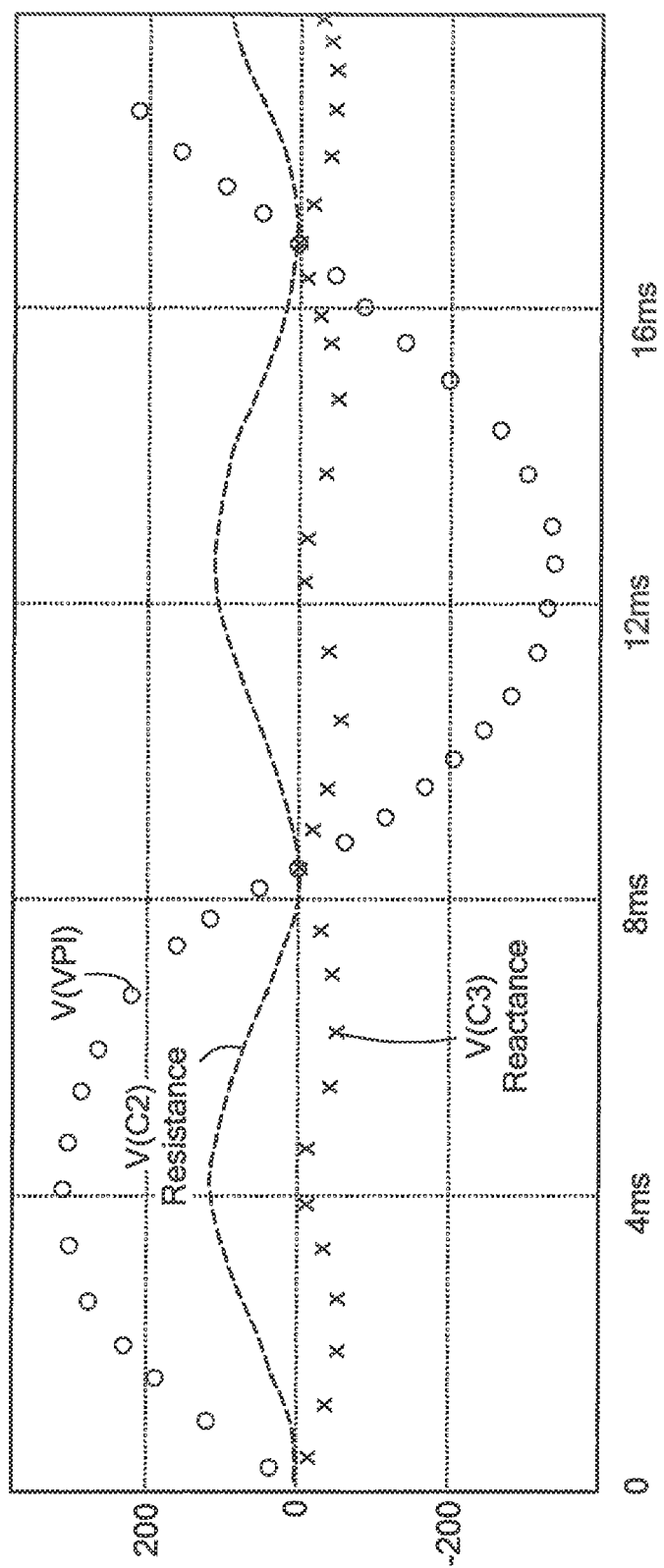
FIG. 10 is a plot illustrating voltage and impedance waveforms resulting from the circuit simulation of FIG. 9 for a single phase.
Figure 10A:
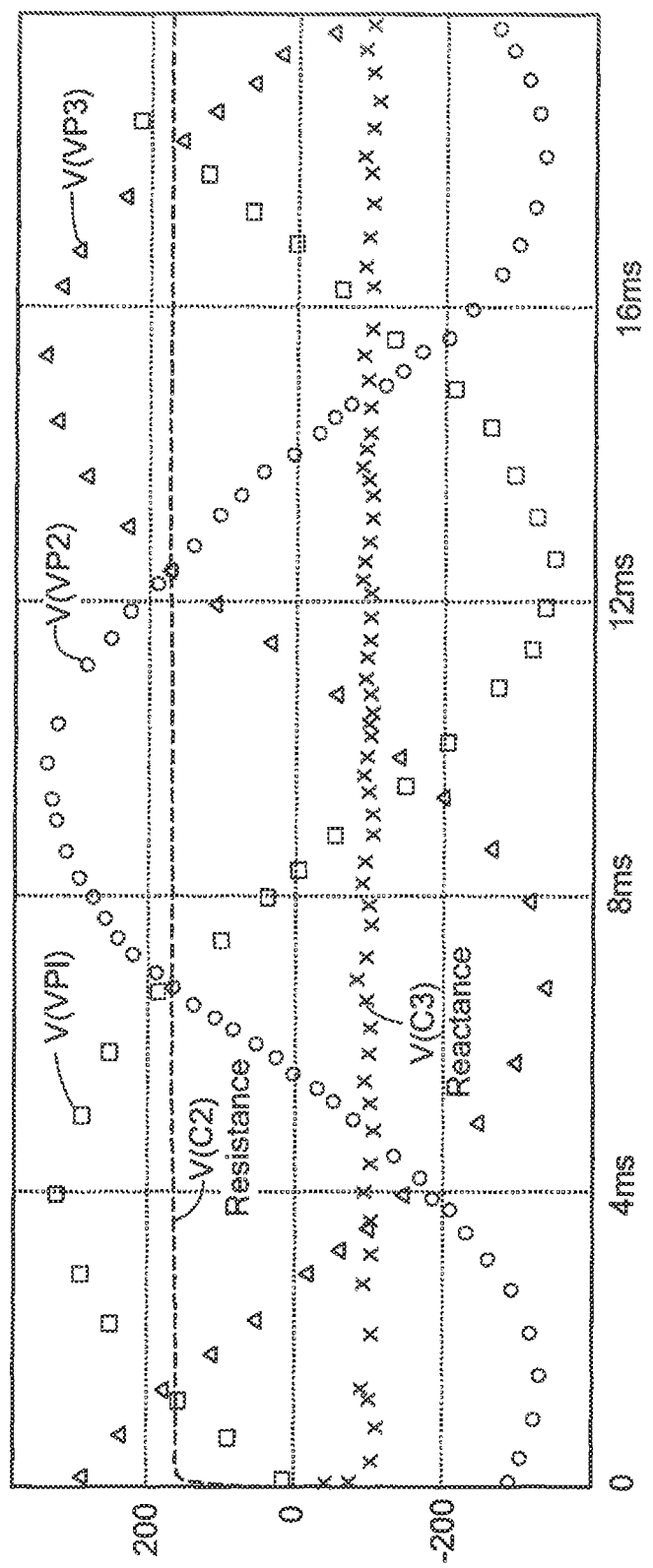
FIG. 10A is a plot illustrating voltage and impedance waveforms resulting from the circuit simulation of FIG. 9 for all three phases.

The circuit simulation schematic in FIG. 9 is constructed to implement the phase-shift modulation solution in Equation (11) for the three phase converter. Subcircuit X1 is a controller which provides the switching control signals for each block. In some implementations, subcircuit X1 may be implemented as a soft digital controller including associated programming code, although other controller types may be used. In one embodiment, subcircuit X1 may be described by the following code in the C programming language:

```
vlogic=5;
vp1=sin(wline*t-0);
vp2=sin(wline*t-120);
vp3=sin(wline*t-240);
vt1=(vp1>0)?acos(vp1): -acos(vp1);
vt2=(vp2>0)?acos(vp2): -acos(vp2);
vt3=(vp3>0)?acos(vp3): -acos(vp3);
vg1=(sin(wsw*t-vt1))>0)?vlogic: 0;
``` vg2=(sin(wsw*t−vt2))>0)?vlogic: 0;
vg3=(sin(wsw*t−vt3))>0)?vlogic: 0;

FIGS. 10 and 10A are waveform diagrams illustrating the waveforms generated from the circuit simulation of FIG. 9, with the individual traces of the voltages and impedances labeled. FIG. 10 shows the waveforms for a single phase when the other two phases are disabled, as a comparison to FIG. 10A which shows the waveforms for operation with all three phases. A comparison of the simulation waveforms in FIG. 10A with those of the calculated results in FIG. 8 indicates that they match very closely, validating the derivation. The sinusoidal power transfer constraint in Equation (3) is verified by inspecting a single phase of the three phases in the circuit, as shown in FIGS. 10 and 10A.

Having described preferred embodiments of the concepts, systems, circuits and techniques described herein, it will now become apparent to those of ordinary skill in the art that other embodiments incorporating these concepts may be used. For example, it should now be appreciated that one can apply the topologies described herein to rectifier systems (e.g., for grid-connected power supplies) as well and for bidirectional power flow converter systems. Accordingly, it is submitted that that the concepts, systems, circuits and techniques described herein, should not be limited to the described embodiments but rather should be limited only by the spirit and scope of the appended claims.

What is claimed is:

1. A power conversion circuit having an input port to receive a direct current (DC) input signal and multiple output ports to provide a multi-phase alternating current (AC) output signal, the power conversion circuit comprising:
   an inverter circuit to convert the DC input signal to an AC current signal at an inverter circuit output port, the inverter circuit including a number of controllable switches;
   a transformer stage having an input port and multiple output ports, the transformer stage coupled to receive the AC current signal at the transformer stage input port and configured to provide at least one of electrical isolation and voltage transformation between the inverter circuit output port and the multiple output ports of the power conversion circuit; and
   a cycloconverter stage having multiple cycloconverter circuits, with each of the multiple cycloconverter circuits supporting a corresponding phase of the multi-phase AC output signal of the power conversion circuit and including a number of controllable switches, wherein each of the multiple cycloconverter circuits includes an input port coupled to receive an input signal from a corresponding output port of the transformer stage and an output port to provide an AC output signal of the power conversion circuit for the corresponding phase, and each of the multiple cycloconverter circuits are controlled, at least in part, by select ones of the controllable switches in the cycloconverter circuits to provide a phase-shift between a resonant AC current and a switching voltage of the cycloconverter circuits at which outputs of the cycloconverter circuits provide the AC output signal of the power conversion circuit for the corresponding phase, wherein the phase-shift is based, at least in part, on polarity of an applied voltage at a corresponding cycloconverter stage output port,
      wherein the controllable switches of said cycloconverter stage are controlled relative to a switching function of said cycloconverter stage which determines power flow through said cycloconverter stage, and the power flow through said cycloconverter stage is modulated by modifying the switching function of said cycloconverter stage relative to the resonant AC current.

2. The power conversion circuit of claim 1, wherein:
   one or more of the input ports of the multiple cycloconverter circuits are galvanically isolated from the inverter circuit.

3. The power conversion circuit of claim 2, wherein:
   each of the input ports of the multiple cycloconverter circuits are galvanically isolated from the input ports of the other cycloconverter circuits.

4. The power conversion circuit of claim 1, wherein:
   the multiple cycloconverter circuits are each comprised of first and second half-bridge circuits, wherein the first and second half-bridge circuits include first and second unidirectional voltage blocking half-bridge circuits coupled in a back-to-back configuration.

5. The power conversion circuit of claim 1, wherein:
   each of the multiple cycloconverter circuits includes a first half-bridge circuit having first, second, and third terminals and a second half-bridge circuit having first, second, and third terminals, wherein the first terminal of each of the first and second half-bridge circuits corresponds to the input port of the cycloconverter circuit, the second terminal of each of the first and second half-bridge circuits corresponds to the output port of the cycloconverter circuit, and the third terminals of the first and second half-bridge circuits are coupled to one another.

6. The power conversion circuit of claim 4, further comprising:
   a controller to control switching of the controllable switches within the inverter circuit and the controllable switches in each of the multiple cycloconverter circuits, the controller being configured to: for a first polarity of a voltage signal provided at the output port of a first cycloconverter circuit, bias first and second switches of the first half-bridge circuit of the first cycloconverter circuit into their conduction states and modulate the first and second switches of the second half-bridge of the first cycloconverter circuit.

7. The power conversion circuit of claim 6, wherein:
   the controller is configured to: for a second, different polarity of the voltage signal provided at the output port of the first cycloconverter circuit, bias the first and second switches of the second half-bridge circuit of the first cycloconverter circuit into their conduction states and modulate the first and second switches of the first half-bridge circuit of the first cycloconverter circuit.

8. A power conversion circuit having input terminals to receive a direct current (DC) voltage signal and output terminals to provide a multi-phase alternating current (AC) voltage signal, the power conversion circuit comprising: an inverter circuit having input terminals and output terminals, the input terminals corresponding to the input terminals of the power conversion circuit, wherein the inverter circuit is configured to convert a DC voltage signal received at the input terminals to a high-frequency AC signal at the output terminals; a transformer stage having an input port coupled to the output port of the inverter circuit and having at least two output ports, wherein the transformer stage is configured to provide voltage transformation for the high-frequency AC signal received at the output of the inverter circuit; and a cycloconverter stage having multiple cycloconverter circuits, with each of the multiple cycloconverter circuits having an input port to receive a signal from a corresponding output port of the transformer stage and an output port to deliver an output signal having a corresponding phase of the multi-phase AC voltage signal, the multiple cycloconverter circuits each being configured to receive the signal from the corresponding output of the transformer stage and to frequency convert the signal to generate the corresponding output signal, each cycloconverter circuit comprising: a first half-bridge circuit having first, second, and third terminals; and a second half-bridge circuit having first, second, and third terminals; wherein the first terminal of each of the first and second half-bridge circuits corresponds to one of the input terminals of the cycloconverter circuit, the second terminal of each of the first and second half-bridge circuits corresponds to one of the output terminals of the cycloconverter circuit, and the third terminal of each of the first and second half-bridge circuits is coupled to the third terminal of the other of the first and second half-bridge circuits, and wherein each of the multiple cycloconverter circuits are controlled, at least in part, by select ones of the first and second half-bridge circuits in the cycloconverter circuits to provide a phase-shift between a resonant AC current and a switching voltage of the cycloconverter circuits at which outputs of the cycloconverter circuits provide the AC output signal of the power conversion circuit for the corresponding phase, wherein the phase-shift is based, at least in part, on polarity of an applied voltage at a corresponding cycloconverter stage output port, and wherein each of the first and second half-bridge circuits are controlled relative to a switching function of said cycloconverter stage which determines power flow through said cycloconverter stage, and the power flow through said cycloconverter stage is modulated by modifying the switching function of said cycloconverter stage relative to the resonant AC current.

9. The power conversion circuit of claim 8, wherein:
the first half-bridge circuit of each cycloconverter circuit comprises first and second switches each having first, second, and third terminals and a bypass capacitor and the second half-bridge circuit of the cycloconverter circuit comprises first and second switches each having first, second, and third terminals and a bypass capacitor.

10. The power conversion circuit of claim 9, further comprising:
a controller to control switching of switches within the inverter circuit and the multiple cycloconverter circuits, the controller being configured to: for a first polarity of a voltage signal provided at the output port of a first cycloconverter circuit, bias first and second switches of the first half-bridge circuit of the first cycloconverter circuit into their conduction states and modulate the first and second switches of the second half-bridge of the first cycloconverter circuit.

11. The power conversion circuit of claim 10, wherein:
the controller is configured to: for a second, different polarity of the voltage signal provided at the output port of the first cycloconverter circuit, bias the first and second switches of the second half-bridge circuit of the first cycloconverter circuit into their conduction states and modulate the first and second switches of the first half-bridge circuit of the first cycloconverter circuit.

12. The power conversion circuit of claim 9, further comprising:
a controller to control switching of switches within the inverter circuit and the multiple cycloconverter circuits, the controller being configured to: for at least some operating conditions, modulate the first switch of the first half-bridge circuit and the second switch of the second half-bridge circuit on and off substantially simultaneously, and modulate the second switch of the first half-bridge circuit and the first switch of the second half-bridge circuit on and off substantially simultaneously.

13. The power conversion circuit of claim 9, further comprising:
a controller to control switching of switches within the inverter circuit and the multiple cycloconverter circuits, the controller being configured to: for at least some operating conditions, modulate the first switch of the first half-bridge circuit and the first switch of the second half-bridge circuit on and off substantially simultaneously, and modulate the second switch of the first half-bridge circuit and the second switch of the second half-bridge circuit on and off substantially simultaneously.

14. In a system, a power conversion circuit having an input port to receive a direct current (DC) input signal and multiple output ports to provide a multi-phase alternating current (AC) output signal, the power conversion circuit comprising: two or more cycloconverter circuits each having an input and an output, with each cycloconverter circuit comprising: a first half-bridge circuit having first, second, and third terminals, the first half-bridge circuit comprising first and second switches each having first, second and third terminals and a bypass capacitor; and a second half-bridge circuit having first, second, and third terminals, the second half-bridge circuit comprising first and second switches each having first, second, and third terminals and a bypass capacitor; wherein the first terminal of each of the first and second half-bridge circuits corresponds to the input of the cycloconverter circuit, the second terminal of each of the first and second half-bridge circuits corresponds to the output of the cycloconverter circuit, and the third terminal of the first half-bridge circuit is coupled to the third terminal of the second half-bridge circuit; and wherein each of the cycloconverter circuits generates an AC output signal having a corresponding phase of the multi-phase AC output signal of the power conversion circuit, and wherein each of the cycloconverter circuits are provided as part of a cycloconverter stage and are controlled, at least in part, by select ones of the first and second half-bridge circuits in the cycloconverter circuits to provide a phase-shift between a resonant AC current and a switching voltage of the cycloconverter circuits at which outputs of the cycloconverter circuits provide the AC output signal of the power conversion circuit for the corresponding phase, wherein the phase-shift is based, at least in part, on polarity of an applied voltage at a corresponding cycloconverter stage output port, and wherein each of the first and second half-bridge circuits are controlled relative to a switching function of said cycloconverter stage which determines power flow through said cycloconverter stage, and the power flow through said cycloconverter stage is modulated by modifying the switching function of said cycloconverter stage relative to the resonant AC current.

15. The system of claim 14, further comprising:
a controller to control switching of switches within the two or more cycloconverter circuits, the controller being configured to: for a first polarity of a voltage signal provided at the output port of a first cycloconverter circuit, bias first and second switches of the first half-bridge circuit of the first cycloconverter circuit into their conduction states and modulate the first and second switches of the second half-bridge of the first cycloconverter circuit.

16. The system of claim 15, wherein:
the controller is configured to: for a second, different polarity of the voltage signal provided at the output port of the first cycloconverter circuit, bias the first and second switches of the second half-bridge circuit of the first cycloconverter circuit into their conduction states and modulate the first and second switches of the first half-bridge circuit of the first cycloconverter circuit.

17. The system of claim 14, further comprising:
a controller to control switching of switches within the two or more cycloconverter circuits, the controller being configured to: for at least some operating conditions, modulate the first switch of the first half-bridge circuit and the second switch of the second half-bridge circuit on and off substantially simultaneously, and modulate the second switch of the first half-bridge circuit and the first switch of the second half-bridge circuit on and off substantially simultaneously.

18. The system of claim 14, further comprising:
a controller to control switching of switches within the two or more cycloconverter circuits, the controller being configured to: for at least some operating conditions, modulate the first switch of the first half-bridge circuit and the first switch of the second half-bridge circuit on and off substantially simultaneously, and modulate the second switch of the first half-bridge circuit and the second switch of the second half-bridge circuit on and off substantially simultaneously.

19. The power conversion circuit of claim 1 wherein the switching voltage of the cyclococonverter circuits is determined by the switching function of said cycloconverter stage.

20. The power conversion circuit of claim 1 wherein said transformer stage is further configured to provide impedance shaping between the inverter circuit output port and the transformer stage output ports and to generate AC current signals at the transformer stage output ports, wherein the AC current signal generated by said inverter circuit is provided having a first voltage level and the AC current signals generated by said transformer stage are provided having a second, different voltage level.

21. The power conversion circuit of claim 20 wherein the AC current signals generated by said transformer stage are provided having a first frequency and the AC output signals of the power conversion circuit are provided having a second, different frequency.

22. The power conversion circuit of claim 1 wherein the resonant AC current is provided by a resonant circuit which is serially coupled in a select portion of a signal path between an input port of said inverter circuit and the input ports of said cycloconverter circuits.

23. The power conversion circuit of claim 1 wherein magnitude of the resonant AC current signal is selected to control power flow through at least one of said inverter circuit and said cycloconverter stage.

24. The power conversion circuit of claim 1 wherein the switches of said inverter circuit are controlled relative to a switching function of said inverter circuit which determines power flow through said inverter circuit, and the power flow through said inverter circuit is modulated by modifying the switching function of said inverter circuit relative to the resonant AC current signal.

* * * * *